Nov. 20, 1928.
J. B. PAGIN
1,692,222
METHOD OF DECORATING FISH LURES
Filed Aug. 8, 1927
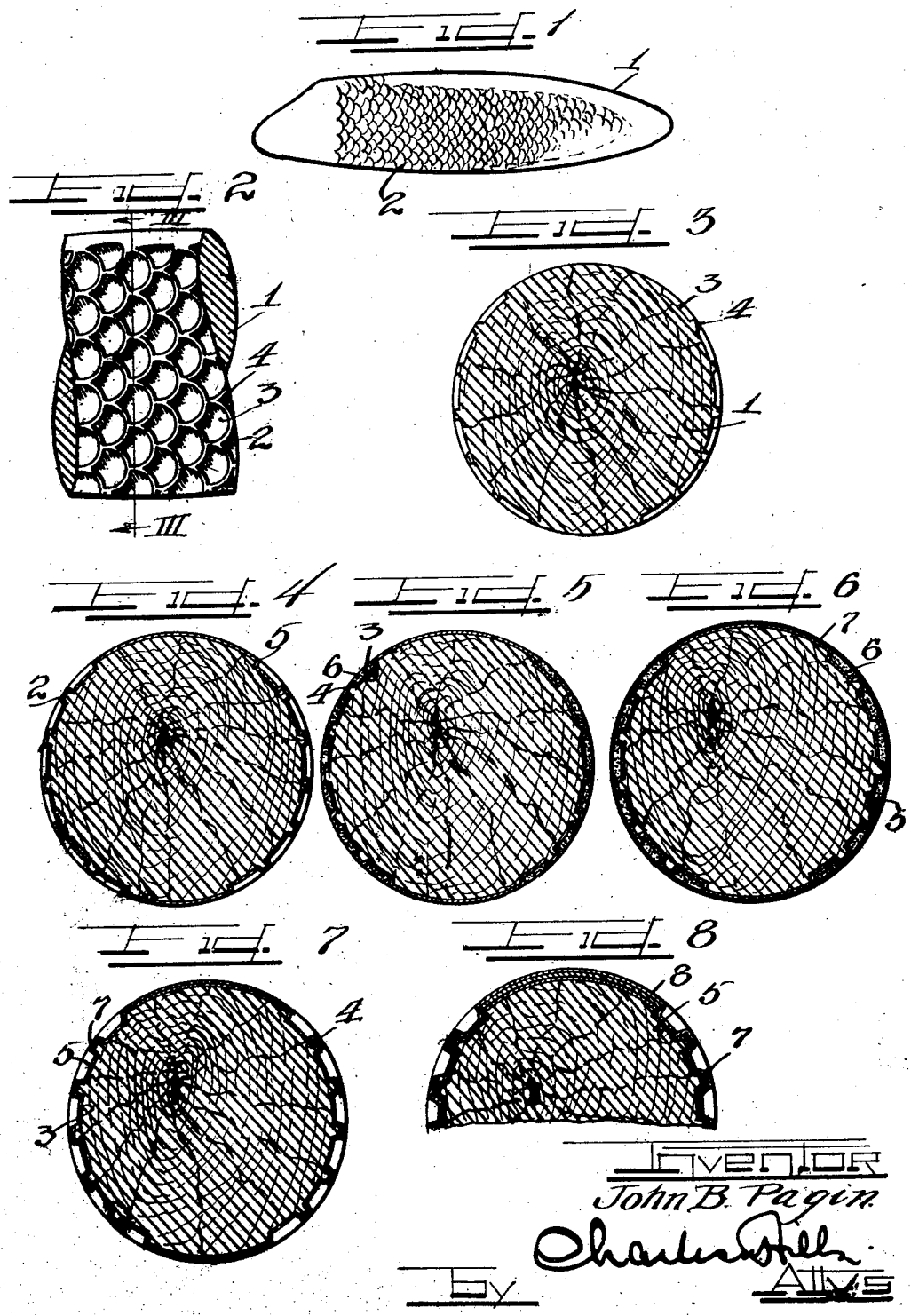

Patented Nov. 20, 1928.

1,692,222

UNITED STATES PATENT OFFICE.

JOHN B. PAGIN, OF SOUTH BEND, INDIANA, ASSIGNOR TO THE SOUTH BEND BAIT COMPANY, A CORPORATION OF INDIANA.

METHOD OF DECORATING FISH LURES.

Application filed August 8, 1927 Serial No. 211,288.

This invention relates to a process of decorating fish lures and has for its object to provide a practicable method of forming realistic scale-like impressions on the fish lures and finishing the surface of the fish lures in distinctive colors to heighten the scale-like effect.

Other and further important objects of this invention will become apparent from the disclosures in the following description and appended claims.

In the accompanying drawings which illustrate a preferred embodiment of this invention and in which similar reference numerals refer to similar features in the different views:

Figure 1 is a side elevational view of a fish bait in an initial stage of finishing.

Figure 2 is an enlarged fragmentary elevational view of the same.

Figure 3 is a sectional view taken on line III—III of Figure 2.

Figures 4 to 8 inclusive are enlarged cross-sectional views illustrating the different steps in the finishing operation.

As shown on the drawings:

The reference numeral 1 indicates a bait body, preferably formed of wood and provided with scale-like impressions 2 on each of its sides. The impressions 2 may be suitably formed by passing the fish bait between dies or rollers. Each of the impressions 2 comprises a central depressed portion 3 bounded by raised outlines 4, the outlines in general simulating the outlines of the scales on a real fish.

According to my process, the fish bait body 1, after receiving the scale-like impressions 2, is coated with a base coat of paint 5 (Figure 4). The coat of paint 5 covers the entire bait surface including the scale-like impressions 2. The depressed portions 3 of the scale-like impressions 2 are next filled with a protective layer 6 of some non-coherent material such as chalk and water. The purpose of this is to permit the bait body to be again painted without painting the depressed portions of the scale-like impressions. The protective layer 6 may be applied by any suitable means and the excess scraped or rubbed off so as to leave the raised outlines 4 uncovered.

A second coating of paint 7 is then applied, as by spraying, over the entire bait surface. The portion of the paint coating 7 that adheres to the protective layer 6 is removed by scrubbing or washing the protective layer 6 from the depressed areas 3. The fish bait at this stage, as illustrated by Figure 7, carries two exposed coatings of paint 5 and 7, the coating 5 covering the depressed areas 3 and the coating 7 covering the rest of the surface of the fish bait including the raised outlines 4. Preferably the color of the respective paint coatings 5 and 7 present sufficient contrast to heighten the scale-like effect produced by the impressions 2. A final coat 8 of waterproof and colorless varnish or shellac is last applied to the bait body to produce the finished bait.

It will thus be apparent that I have provided a method of decorating a fish lure to obtain a very realistic bait, wherein the scale-like effect is produced both by impressions formed in the surface of the bait body and by distinctive coloring of the scale outlines and fish bait body.

I am aware that many changes may be made and numerous details of the process may be varied through a wide range without departing from the principles of this invention and I, therefore, do not purpose limiting the patent granted hereon, otherwise than necessitated by the prior art.

I claim as my invention:

1. The process of decorating fish baits, which comprises forming impressions representing scales on the surface of the bait body, applying a coating of paint over said surface, filling the depressed scale-like portions with a protective layer of non-coherent material, applying a coating of a distinctively colored paint over the bait surface and removing the protective layer with whatever paint may be adhering thereto.

2. The process of decorating fish baits, which comprises forming scale-like impressions on the sides of the bait body, applying a base coat of paint over the entire body, filling the depressed portions of said scale-like impressions with a protective layer of relatively non-coherent material, painting over the body surface with a distinctively colored pigment, removing the protective non-coherent layer together with paint adhering thereto and applying a waterproof film over the entire bait body.

3. The process of decorating fish baits, which comprises indenting the surface of the bait body, applying a coating of paint over said bait surface, protecting the indented portions of the bait surface, applying a second coating of paint of distinctive color from the first and removing the protection together with any of the second coating of paint adhering thereto.

In testimony whereof I have hereunto subscribed my name at South Bend, St. Joseph County, Indiana.

JOHN B. PAGIN.